US012628116B2

(12) United States Patent　　　　(10) Patent No.:　US 12,628,116 B2

Jiang　　　　　　　　　　　　　　(45) Date of Patent:　May 12, 2026

(54) POSITIONING METHOD AND APPARATUS, AND COMMUNICATION DEVICE AND STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 343 days.

(21) Appl. No.: 18/265,241

(22) PCT Filed: Dec. 4, 2020

(86) PCT No.: PCT/CN2020/133977
§ 371 (c)(1),
(2) Date: Jun. 2, 2023

(87) PCT Pub. No.: WO2022/116164
PCT Pub. Date: Jun. 9, 2022

(65) Prior Publication Data

US 2024/0015691 A1　　Jan. 11, 2024

(51) Int. Cl.
*H04W 64/00*　　　(2009.01)
*H04W 8/24*　　　(2009.01)

(52) U.S. Cl.
CPC ........... *H04W 64/006* (2013.01); *H04W 8/24* (2013.01)

(58) Field of Classification Search
CPC ... H04W 72/0453; H04W 8/24; H04W 72/23; H04W 24/10; H04W 72/51; H04W 72/21; H04W 8/22; H04W 72/04; H04W 24/02; H04W 72/0446; H04W 72/20; H04W 92/18; H04W 72/25
See application file for complete search history.

(56) References Cited

U.S. PATENT DOCUMENTS

| | | | |
|---|---|---|---|
| 2012/0040687 A1* | 2/2012 | Siomina | H04W 24/00 455/422.1 |
| 2015/0133157 A1 | 5/2015 | Xiao et al. | |
| 2018/0206113 A1* | 7/2018 | He | H04W 8/24 |

(Continued)

FOREIGN PATENT DOCUMENTS

| | | |
|---|---|---|
| CN | 103582115 A | 2/2014 |
| CN | 109923842 A | 6/2019 |
| CN | 110891291 A | 3/2020 |

(Continued)

OTHER PUBLICATIONS

International Search Report of PCT/CN2020/133977 dated Sep. 3, 2021 with English translation, (4p).

(Continued)

*Primary Examiner* — Kwasi Karikari
(74) *Attorney, Agent, or Firm* — Arch & Lake LLP; Hao Tan; Shen Wang

(57) ABSTRACT

Positioning methods and communication devices are provided. In one positioning method, a first terminal device sends a capability indication message to a second terminal device, the capability indication message carries bandwidth indication information of the first terminal device, and the bandwidth indication information of the first terminal device represents a bandwidth supported by the first terminal device for positioning.

19 Claims, 3 Drawing Sheets receiving a capability request message sent by the second terminal device　⌐ 301 determining, based on the bandwidth indication information of the second terminal device, the bandwidth indication information of the first terminal device carried in the capability indication message　⌐ 302 sending the capability indication message to the second terminal device　⌐ 303

(56) References Cited

U.S. PATENT DOCUMENTS

2019/0297489 A1    9/2019   Lei et al.
2020/0358576 A1    11/2020  Zarifi et al.

FOREIGN PATENT DOCUMENTS

CN          111342943  A      6/2020
CN          111886909  A      11/2020

OTHER PUBLICATIONS

Huawei, "Finalizing SRS for NR positioning", 3GPP TSG RAN WG1 Meeting #101-e, R1-2003522, E-meeting, May 25-Jun. 5, 2020, (12p).
The First CNOA issued in Application No. 202080003771.X, dated Oct. 24, 2024, with English translation, (13p).

\* cited by examiner sending a capability indication message to a second terminal device, the capability indication message carries bandwidth indication information of the first terminal device, and the bandwidth indication information of the first terminal device represents a bandwidth supported by the first terminal device for positioning ⌐ 101
FIG. 1
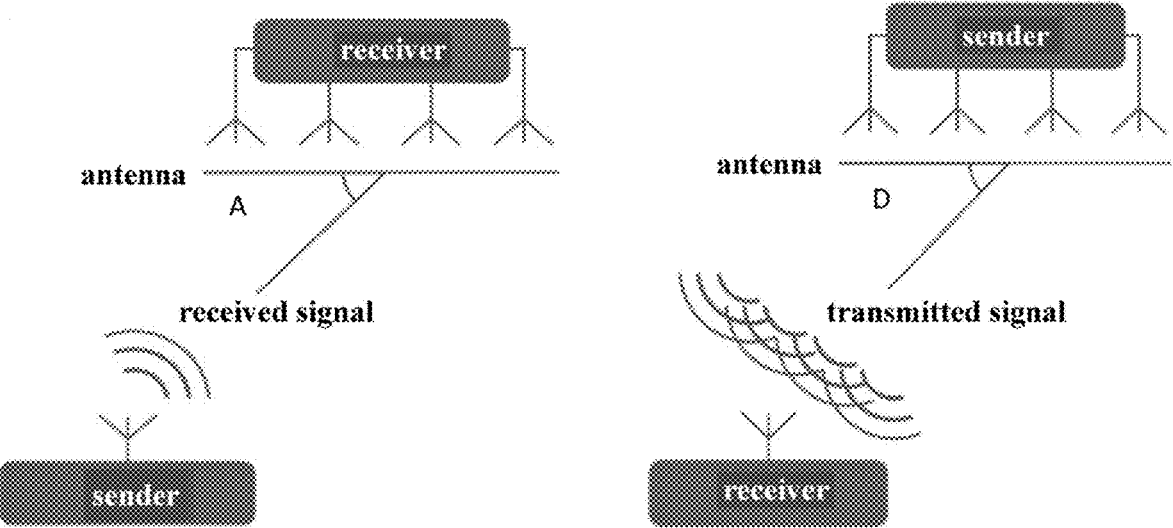
FIG. 2
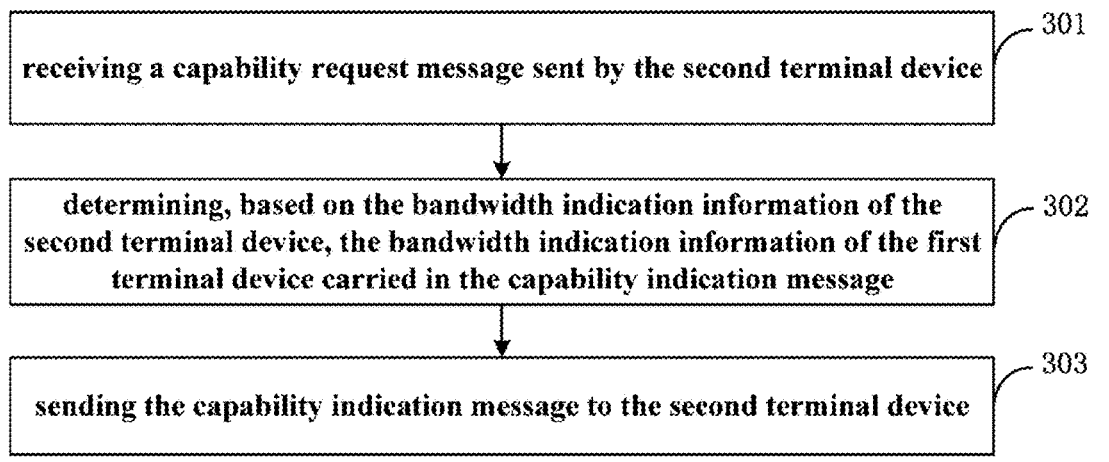
FIG. 3

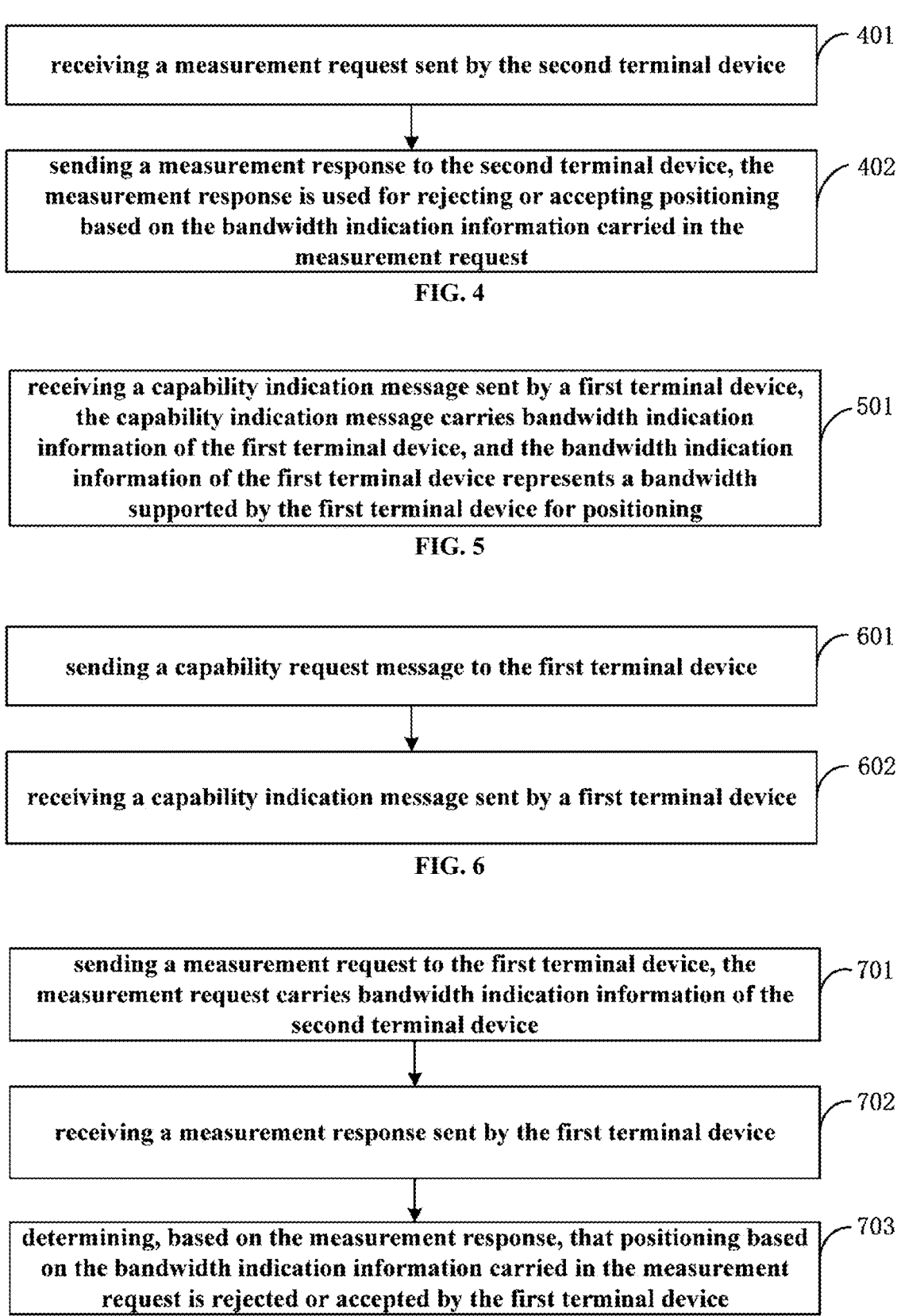

receiving a measurement request sent by the second terminal device ⌐ 401 sending a measurement response to the second terminal device, the measurement response is used for rejecting or accepting positioning based on the bandwidth indication information carried in the measurement request ⌐ 402

FIG. 4 receiving a capability indication message sent by a first terminal device, the capability indication message carries bandwidth indication information of the first terminal device, and the bandwidth indication information of the first terminal device represents a bandwidth supported by the first terminal device for positioning ⌐ 501

FIG. 5 sending a capability request message to the first terminal device ⌐ 601 receiving a capability indication message sent by a first terminal device ⌐ 602

FIG. 6 sending a measurement request to the first terminal device, the measurement request carries bandwidth indication information of the second terminal device ⌐ 701 receiving a measurement response sent by the first terminal device ⌐ 702 determining, based on the measurement response, that positioning based on the bandwidth indication information carried in the measurement request is rejected or accepted by the first terminal device ⌐ 703

FIG. 7

POSITIONING METHOD AND APPARATUS, AND COMMUNICATION DEVICE AND STORAGE MEDIUM

CROSS-REFERENCE TO RELATED APPLICATIONS

The present application is the U.S. National Stage of International Application No. PCT/CN2020/133977, filed on Dec. 4, 2020, the contents of which are incorporated herein by reference in their entireties for all purposes.

BACKGROUND

In a wireless communication system, in order to determine a distance between one terminal device and another terminal device, there is usually a need for positioning between terminal devices. The positioning is achieved based on a bandwidth of a signal used, however, the bandwidth supported by different devices varies. How to accurately determine the bandwidth is crucial for positioning.

SUMMARY

The present disclosure relates to the technology field of wireless communication, and in particular to a positioning method and apparatus, and communication device and storage medium.

In a first aspect, the present disclosure provides a positioning method. The method is executed by a first terminal device and includes:

sending a capability indication message to a second terminal device, where the capability indication message carries bandwidth indication information of the first terminal device, and the bandwidth indication information of the first terminal device represents a bandwidth supported by the first terminal device for positioning.

In a second aspect, the present disclosure provides a positioning method. The method is executed by a second terminal device and includes:

receiving a capability indication message sent by a first terminal device, where the capability indication message carries bandwidth indication information of the first terminal device, and the bandwidth indication information of the first terminal device represents a bandwidth supported by the first terminal device for positioning.

In a third aspect, the present disclosure provides a communication device, including: a transceiver; a memory; and a processor, connected to the transceiver and the memory respectively, where the processor is configured to control sending and receiving of a wireless signal of the transceiver through executing a computer-executable instruction of the memory, and the processor is capable of implementing any method described in the first aspect or the second aspect.

In a fourth aspect, the present disclosure provides a computer storage medium. The computer storage medium stores a computer-executable instruction, where the computer executable instruction, when executed by a processor, is capable of implementing any method described in the first aspect or the second aspect.

The additional aspects and advantages of the present disclosure will be partially provided in the following description, and some will become apparent from the following description or will be learned through the practice of the present disclosure.

BRIEF DESCRIPTION OF THE DRAWINGS

The above and/or additional aspects and advantages of the present disclosure will become apparent and easy to understand from the description of the embodiments in conjunction with the accompanying drawings.

FIG. 1 is a schematic flowchart of a positioning method provided by an embodiment of the present disclosure.

FIG. 2 is a schematic diagram of a relative angle provided by an embodiment of the present disclosure.

FIG. 3 is a schematic flowchart of another positioning method provided by an embodiment of the present disclosure.

FIG. 4 is a schematic flowchart of another positioning method provided by an embodiment of the present disclosure.

FIG. 5 is a schematic flowchart of a positioning method provided by an embodiment of the present disclosure.

FIG. 6 is a schematic flowchart of another positioning method provided by an embodiment of the present disclosure.

FIG. 7 is a schematic flowchart of another positioning method provided by an embodiment of the present disclosure.

DETAILED DESCRIPTION

Figure 8:
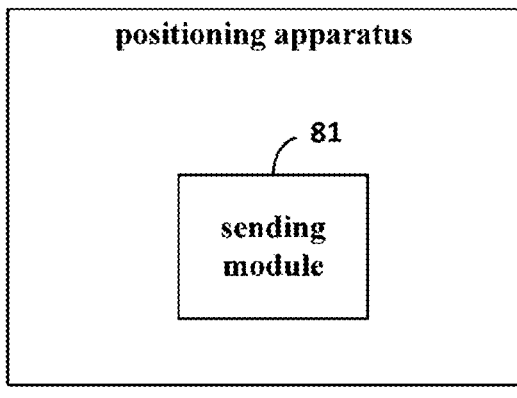
FIG. 8 is a schematic structure diagram of a positioning apparatus provided by an embodiment of the present disclosure.

Exemplary embodiments will be described herein in detail, examples of which are represented in the accompanying drawings. Where the following description relates to the accompanying drawings, the same numerals in different accompanying drawings indicate the same or similar elements unless otherwise indicated. The embodiments described in the following exemplary embodiments do not represent all embodiments that are consistent with embodiments of the present disclosure. Rather, they are only examples of apparatus and methods that are consistent with some aspects of the embodiments of the present disclosure, as detailed in the appended claims.

The terms used in the embodiments of the present disclosure are used solely for the purpose of describing particular embodiments and are not intended to limit the embodiments of the present disclosure. The singular forms of "a" and "the" as used in the embodiments of the present disclosure and the appended claims are also intended to include multiple forms, unless the context clearly indicates otherwise. It should also be understood that the term "and/or" as used herein refers to and encompasses any or all possible combinations of one or more of the associated listed items.

It should be understood that although the terms first, second, third, etc. may be used to describe various information in the embodiments of the present disclosure, such information should not be limited to these terms. These terms are only used to distinguish the same type of information from each other. For example, without departing from the scope of the embodiments of the present disclosure, the first information may also be referred to as the second information, and similarly, the second information may also be referred to as the first information. Depending on the context, the word "if" used herein may be interpreted as "at the time of . . . ," "when . . . " or "in response to determining that."

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

The embodiments of the present disclosure are described in detail below, and examples of the embodiments are illustrated in the accompanying drawings, herein, the same or similar symbols from beginning to end indicate the same or similar elements. The embodiments described below with reference to the accompanying drawings are exemplary and are intended to be used to explain the present disclosure, but cannot be understood as limiting the present disclosure.

The present disclosure provides a positioning method and apparatus, and communication device and storage medium for solving the technical problem of inaccurate determination of the bandwidth used for positioning and poor positioning accuracy between devices. The positioning method and apparatus, and communication device and storage medium provided by the present disclosure are described in detail below with reference to the accompanying drawings.

FIG. 1 is a schematic flowchart of a positioning method provided by an embodiment of the present disclosure. The method is applied to a first terminal device.

As shown in FIG. 1, the method includes step 101.

In the step 101, a capability indication message is sent to a second terminal device, the capability indication message carries bandwidth indication information of the first terminal device, and the bandwidth indication information of the first terminal device represents a bandwidth supported by the first terminal device for positioning.

The first terminal device and the second terminal device in the embodiments of the present disclosure are two terminal devices that need to be positioned, that is, two terminal devices that need to be negotiated to determine the bandwidth to be used for positioning, and are referred to as the first terminal device and the second terminal device, respectively, for ease of differentiation. There is no priority difference between the first terminal device and the second terminal device.

Terminal devices may be dispersed throughout the entire mobile communication system, and each terminal device may be stationary or mobile. The terminal devices may also be referred to by those skilled in the art as mobile stations, user stations, mobile units, user units, wireless units, remote units, mobile devices, wireless devices, wireless communication devices, remote devices, mobile user stations, access user devices, mobile user devices, wireless user devices, remote user devices, handheld devices, user agents, mobile clients, clients, or some other appropriate terminology. The terminal devices may be cellular phones, personal digital assistants (PDAs), wireless modems, wireless communication devices, handheld devices, tablets, laptops, cordless telephone, wireless local loop (WLL) stations, etc., and can communicate with the network device in the mobile communication system.

As an implementation, the capability indication message is carried by a message supporting the PC5 radio resource control (RRC) protocol.

As another implementation, the capability indication message is carried by a message supporting the PC5-signalling protocol (PC5-S) protocol.

It is to be understood that positioning in the embodiments of the present disclosure includes relative positioning, and the relative positioning includes measuring a relative position, as well as measuring a relative distance and a relative angle. The relative position between two terminal devices is determined based on the combination of the measured relative distance and relative angle.

The bandwidth indication information in the embodiments of the present disclosure may contain different information in different scenarios, which are described separately below by different implementations.

As an implementation, the bandwidth indication information carried in the capability indication message sent by the first terminal device is divided based on frequency for representing at least one of:

bandwidth indication information corresponding to at least one carrier frequency;

bandwidth indication information corresponding to each carrier frequency of intra-band carrier aggregation;

bandwidth indication information corresponding to each carrier frequency of inter-band carrier aggregation; or bandwidth indication information corresponding to each frequency band of inter-band carrier aggregation.

As an implementation, the bandwidth indication information includes an indicator bit used for representing whether distance measurement and/or angle measurement based on carrier aggregation is supported. The indicator bit indicates whether each carrier frequency of carrier aggregation or a single each carrier frequency is used for the distance measurement and/or angle measurement.

As a second implementation, the bandwidth indication information carried in the capability indication message sent by the first terminal device is divided based on function for representing at least one of:

a bandwidth used for measuring a relative angle, and the relative angle includes an arrival angle and/or a departure angle; or a bandwidth used for measuring a relative distance.

In one scenario, the bandwidth indication information carried in the capability indication message sent by the first terminal device is used for representing the bandwidth used for measuring the relative angle, herein, the relative angle includes the arrival angle and/or the departure angle. The arrival angle is the angle between the received signal and the receiver antenna. The departure angle is the angle between the transmitted signal and the transmitting antenna. For example, as shown in FIG. 2, A indicates the arrival angle and D indicates the departure angle. The accuracy and flexibility of the bandwidth determination is improved by the suggestion of the bandwidth required for measuring the relative angle, which also satisfies the suggestion of the bandwidth required for measuring the arrival angle and/or the departure angle.

In another scenario, the bandwidth indication information carried in the capability indication message sent by the first terminal device is used for representing the bandwidth used for measuring the relative distance, which achieves the suggestion of the bandwidth required for measuring the relative distance, and improves the accuracy and flexibility of the bandwidth determination.

In yet another scenario, the bandwidth indication information carried in the capability indication message sent by the first terminal device is used for representing the bandwidth used for measuring the relative distance and representing the bandwidth used for measuring the relative angle, and the relative angle includes the arrival angle and/or the departure angle, which achieves the suggestion of the bandwidth required for measuring the relative distance and the relative angle, and improves the accuracy and flexibility of the bandwidth determination.

As a third implementation, the bandwidth indication information carried in the capability indication message sent by the first terminal device is divided based on the transmission direction for representing at least one of:

a bandwidth used for sending a measurement positioning signal; or a bandwidth used for receiving a measurement positioning signal.

The representation of different bandwidths based on different scenarios and requirements is achieved, satisfying the requirements for the bandwidth determination of different scenarios, and improving the flexibility of the bandwidth determination.

In the embodiment of the present disclosure, where the bandwidth indication information is different indication information, the bandwidths need to be indicated by different identities. As an implementation, the bandwidth is represented using a bandwidth part identity and/or a resource pool identity. Different bandwidths may be represented by different bandwidth part identities and/or resource pool identities.

In this embodiment, the bandwidth part (BWP) is a subset bandwidth of the total bandwidth of the cell, and the bandwidth part identity is used for indicating different bandwidth indication information.

The resource pool includes at least one of: a time domain resource, a frequency domain resource, a subcarrier interval, a cyclic prefix, a cell identity, a carrier identity, or a frequency band identity.

As an implementation, the bandwidth includes a maximum bandwidth and/or a bandwidth list. The maximum bandwidth and/or the bandwidth list may be used for indicating the corresponding carrier frequency, respectively.

In the embodiments of the present disclosure, different terminal devices may support different bandwidths for positioning, and therefore, negotiation of the bandwidth used for positioning is required between the terminal devices performing positioning to achieve the flexibility of the bandwidth determination, and the accuracy of positioning can be increased based on the determined bandwidth. In the embodiments of the present disclosure, the first terminal device sends the capability indication message to the second terminal device to cause the second terminal device to determine the bandwidth used for positioning based on the bandwidth supported by the first terminal device for positioning as indicated by the bandwidth indication information of the first terminal device carried in the capability indication message, i.e., the bandwidth used for positioning determined based on the capability limitation of the first terminal device, realizing that devices with positioning needs negotiate, based on the capability of the supported bandwidth of the devices, to determine the bandwidth used for positioning, improving the flexibility of the bandwidth determination and the reliability of positioning.

In one implementation of the embodiments of the present disclosure, the bandwidth supported by the first terminal device for positioning includes a maximum bandwidth and/or a bandwidth list, the maximum bandwidth and the bandwidth list include the corresponding carrier frequency, and the carrier frequency is a frequency at which the signal is loaded during signal transmission between the first terminal device and the second terminal device.

In the positioning method provided by the embodiments of the present disclosure, the first terminal device sends the capability indication message to the second terminal device, the capability indication message carries the bandwidth indication information of the first terminal device, and the bandwidth indication information of the first terminal device represents the bandwidth supported by the first terminal device for positioning. In the present disclosure, the target bandwidth is determined by negotiation between the second terminal device and the first terminal device, and the negotiation is achieved by sending the bandwidth supported by the capability of the first terminal device for positioning to the second terminal device. By adding the bandwidth negotiation mechanism, flexibility of the bandwidth determination is enhanced and positioning accuracy is improved.

FIG. 3 is a schematic flowchart of another positioning method provided by an embodiment of the present disclosure. The method is applied to a first terminal device.

Based on the positioning method provided in FIG. 3, it is illustrated that by receiving a bandwidth suggested to be used for positioning carried in a capability request message sent by the second terminal device, the first terminal device determines the supported bandwidth for positioning to improve the accuracy of the bandwidth determination. As illustrated in FIG. 3, the method includes steps 301 to 303.

In the step 301, a capability request message sent by the second terminal device is received.

In this embodiment, the capability request message sent by the second terminal device carries bandwidth indication information of the second terminal device, and the bandwidth indication information of the second terminal device in the capability request message represents a bandwidth supported by the second terminal device for positioning.

It is to be understood that the bandwidth supported by the second terminal device for positioning is the suggested bandwidth for use by the first terminal device as determined by the second terminal device based on the positioning requirement. The positioning requirement is, for example, a requirement for positioning accuracy, for example, a requirement for accuracy of measuring a relative angle, or a requirement for accuracy of measuring a relative position, which is not limited in this embodiment.

In this embodiment, the capability request message may be sent by the second terminal device to the first terminal device in response to a request from the first terminal device. Alternatively, the second terminal device actively sends the capability request message to the first terminal device that needs to be negotiated to determine the bandwidth for positioning. While the capability request message is sent, the suggested bandwidth for use by the first terminal device determined by the second terminal device is carried.

As an implementation, the capability request message is carried by a message supporting the PC5 radio resource control (RRC) protocol.

As another implementation, the capability request message is carried by a message supporting the PC5-signalling protocol (PC5-S) protocol.

In one example of the present disclosure, the capability request message carries a target field, and the target field is used for indicating the first terminal device to send the capability indication message.

The bandwidth indication information in the embodiments of the present disclosure may contain different information in different scenarios, which are described separately below by different implementations.

As an implementation, the bandwidth indication information carried in the capability request message sent by the second terminal device is divided based on frequency for representing at least one of:

bandwidth indication information corresponding to at least one carrier frequency;

bandwidth indication information corresponding to each carrier frequency of intra-band carrier aggregation;

bandwidth indication information corresponding to each carrier frequency of inter-band carrier aggregation; or bandwidth indication information corresponding to each frequency band of inter-band carrier aggregation.

As an implementation, the bandwidth indication information includes an indicator bit used for representing whether distance measurement and/or angle measurement based on carrier aggregation is supported. The indicator bit indicates whether each carrier frequency of carrier aggregation or a single each carrier frequency is used for the distance measurement and/or angle measurement.

As a second implementation, the bandwidth indication information carried in the capability request message sent by the second terminal device is divided based on function for representing at least one of:

a bandwidth used for measuring a relative angle, and the relative angle includes an arrival angle and/or a departure angle; or a bandwidth used for measuring a relative distance.

In one scenario, the bandwidth indication information carried in the capability request message sent by the second terminal device is used for representing the bandwidth used for measuring the relative angle, herein, the relative angle includes the arrival angle and/or the departure angle. The accuracy and flexibility of the bandwidth determination is improved by the suggestion of the bandwidth required for measuring the relative angle, which also satisfies the determination of the bandwidth required for measuring the arrival angle and/or the departure angle.

In another scenario, the bandwidth indication information carried in the capability request message sent by the second terminal device is used for representing the bandwidth used for measuring the relative distance, which achieves the determination of the bandwidth required for measuring the relative distance, and improves the accuracy and flexibility of the bandwidth determination.

In yet another scenario, the bandwidth indication information carried in the capability request message sent by the second terminal device is used for representing the bandwidth used for measuring the relative distance and representing the bandwidth used for measuring the relative angle, and the relative angle includes the arrival angle and/or the departure angle, which achieves the determination of the bandwidth required for measuring the relative distance and the relative angle, and improves the accuracy and flexibility of the bandwidth determination.

As a third implementation, the bandwidth indication information carried in the capability request message sent by the second terminal device is divided based on the transmission direction for representing at least one of:

a bandwidth used for sending a measurement positioning signal; or a bandwidth used for receiving a measurement positioning signal.

The representation of different bandwidths based on different scenarios and requirements is achieved, satisfying the requirements for the bandwidth determination of different scenarios, and improving the flexibility of the bandwidth determination.

In the step 302, the bandwidth indication information of the first terminal device carried in the capability indication message is determined based on the bandwidth indication information of the second terminal device.

In this embodiment, after the first terminal device obtains the bandwidth indication information of the second terminal device, the bandwidth supported by the first terminal device for positioning is determined based on the capability of the first terminal device and the bandwidth indication information of the second terminal device, realizing that the first terminal device and the second terminal device negotiate, based on their own capabilities, to determine the supported bandwidth for positioning, improving the flexibility of the bandwidth determination, and thus improving the reliability of positioning based on the supported bandwidth for positioning determined according to the negotiation.

It is noted that the bandwidth indication information of the first terminal device carried in the capability indication message correspondingly represents different information based on the information represented by the received bandwidth indication information of the second terminal device. For details, please refer to the description of different implementations of the bandwidth indication information in the aforementioned embodiments, which will not be repeated here.

In the embodiment of the present disclosure, where the bandwidth indication information is different indication information, the bandwidths need to be indicated by different identities. As an implementation, the bandwidth is represented using a bandwidth part identity and/or a resource pool identity. Different bandwidths may be represented by different bandwidth part identities and/or resource pool identities.

In this embodiment, the bandwidth part (BWP) is a subset bandwidth of the total bandwidth of the cell, and the bandwidth part identity is used for indicating different bandwidth indication information.

The resource pool includes at least one of: a time domain resource, a frequency domain resource, a subcarrier interval, a cyclic prefix, a cell identity, a carrier identity, or a frequency band identity.

As an implementation, the bandwidth includes a maximum bandwidth and/or a bandwidth list. The maximum bandwidth and/or the bandwidth list may be used for indicating the corresponding carrier frequency, respectively.

In the step 303, the capability indication message is sent to the second terminal device.

Furthermore, the first terminal device sends the capability indication message carrying the bandwidth indication information of the first terminal device to the second terminal device in response to the capability request message of the second terminal device.

The step 303, which may refer to the explanation and description in the above embodiments, is based on the same principle and is not repeated herein.

In the positioning method provided by the embodiments of the present disclosure, the first terminal device receives the capability request message sent by the second terminal device, and after the first terminal device obtains the bandwidth indication information of the second terminal device carried in the capability request message, the bandwidth supported by the first terminal device for positioning is determined based on the information indicated by the bandwidth indication information of the second terminal device, realizing that the first terminal device and the second terminal device negotiate, based on the measuring requirement and their own capabilities, to determine the supported bandwidth for positioning, improving the flexibility of the bandwidth determination, and thus improving the reliability of positioning based on the supported bandwidth for positioning determined according to the negotiation.

FIG. 4 is a schematic flowchart of another positioning method provided by an embodiment of the present disclosure. The method is applied to a first terminal device.

Based on the positioning method provided in FIG. 4, it is illustrated that the first terminal device, after sending a capability indication message to a second terminal device, further negotiates based on bandwidth indication information carried in the measurement request to determine the final bandwidth for positioning. As shown in FIG. 4, the method includes the steps 401 to 402.

In the step 401, a measurement request sent by the second terminal device is received, the measurement request carries bandwidth indication information of the second terminal device, and the bandwidth indication information of the second terminal device in the measurement request represents a bandwidth suggested by the second terminal device for positioning.

In this embodiment, the bandwidth suggested by the second terminal device for positioning is the bandwidth used for this positioning determined based on the bandwidth supported by the first terminal device for positioning represented by the bandwidth indication information of the first terminal device, which achieves a further negotiated determination of the bandwidth.

In this embodiment, after receiving the measurement request sent by the second terminal device, the first terminal device determines, based on the bandwidth suggested by the second terminal device for positioning, whether the suggested bandwidth for positioning can be used for this positioning.

As an implementation, the measurement request is carried by a message supporting the PC5 radio resource control (RRC) protocol.

As another implementation, the measurement request is carried by a message supporting the PC5-signalling protocol (PC5-S) protocol.

In the step 402, a measurement response is sent to the second terminal device, and the measurement response is used for rejecting or accepting positioning based on the bandwidth indication information carried in the measurement request.

As an implementation, the measurement response is carried by a message supporting the PC5 radio resource control (RRC) protocol.

As another implementation, the measurement response is carried by a message supporting the PC5-signalling protocol (PC5-S) protocol.

In this embodiment, the first terminal device determines, based on the obtained bandwidth suggested by the second terminal device for positioning, whether the suggested bandwidth for positioning can be used for this positioning. In one scenario, if the suggested bandwidth for positioning can be used for this positioning, the measurement response sent by the first terminal device is used for accepting positioning based on the bandwidth indication information carried in the measurement request. In another scenario, if the suggested bandwidth for positioning cannot be used for this positioning, the measurement response sent by the first terminal device is used for rejecting positioning based on the bandwidth indication information carried in the measurement request. In some examples, when sending a rejected measurement response, the measurement response carries bandwidth indication information accepted by the first terminal device, indicating the final bandwidth used for this positioning, improving the flexibility and accuracy of the bandwidth determination, and thus improving the accuracy of positioning based on the bandwidth.

In the positioning method provided by the embodiments of the present disclosure, the final bandwidth used for this positioning is determined by negotiation between the first terminal device and the second terminal device, improving the flexibility and accuracy of the bandwidth determination, and thus improving the accuracy of positioning based on bandwidth.

In order to implement the above embodiments, the present disclosure provides a positioning method, which is executed by a second terminal device.

FIG. 5 is a schematic flowchart of a positioning method provided by an embodiment of the present disclosure. As shown in FIG. 5, the method includes step 501.

In the step 501, a capability indication message sent by a first terminal device is received, the capability indication message carries bandwidth indication information of the first terminal device, and the bandwidth indication information of the first terminal device represents a bandwidth supported by the first terminal device for positioning.

The first terminal device and the second terminal device in the embodiments of the present disclosure are two terminal devices that need to be positioned, that is, two terminal devices that need to be negotiated to determine the bandwidth to be used for positioning, and are referred to as the first terminal device and the second terminal device, respectively, for ease of differentiation. There is no priority difference between the first terminal device and the second terminal device.

Terminal devices may be dispersed throughout the entire mobile communication system, and each terminal device may be stationary or mobile. The terminal devices may also be referred to by those skilled in the art as mobile stations, user stations, mobile units, user units, wireless units, remote units, mobile devices, wireless devices, wireless communication devices, remote devices, mobile user stations, access user devices, mobile user devices, wireless user devices, remote user devices, handheld devices, user agents, mobile clients, clients, or some other appropriate terminology. The terminal devices may be cellular phones, personal digital assistants (PDAs), wireless modems, wireless communication devices, handheld devices, tablets, laptops, cordless telephone, wireless local loop (WLL) stations, etc., and can communicate with the network device in the mobile communication system.

As an implementation, the capability indication message is carried by a message supporting the PC5 radio resource control (RRC) protocol.

As another implementation, the capability indication message is carried by a message supporting the PC5-signalling protocol (PC5-S) protocol.

It is to be understood that positioning in the embodiments of the present disclosure includes relative positioning, and the relative positioning includes measuring a relative position, as well as measuring a relative distance and a relative angle. The relative position between two terminal devices is determined based on the combination of the measured relative distance and relative angle.

The bandwidth indication information in the embodiments of the present disclosure may contain different information in different scenarios, which are described separately below by different implementations.

As an implementation, the bandwidth indication information carried in the capability indication message sent by the first terminal device is divided based on frequency for representing at least one of:

bandwidth indication information corresponding to at least one carrier frequency;

bandwidth indication information corresponding to each carrier frequency of intra-band carrier aggregation;

bandwidth indication information corresponding to each carrier frequency of inter-band carrier aggregation; or bandwidth indication information corresponding to each frequency band of inter-band carrier aggregation.

As an implementation, the bandwidth indication information includes an indicator bit used for representing whether distance measurement and/or angle measurement based on carrier aggregation is supported. The indicator bit indicates whether each carrier frequency of carrier aggregation or a single each carrier frequency is used for the distance measurement and/or angle measurement.

As a second implementation, the bandwidth indication information carried in the capability indication message sent by the first terminal device is divided based on function for representing at least one of:

a bandwidth used for measuring a relative angle, and the relative angle includes an arrival angle and/or a departure angle; or a bandwidth used for measuring a relative distance.

In one scenario, the bandwidth indication information carried in the capability indication message sent by the first terminal device is used for representing the bandwidth used for measuring the relative angle, herein, the relative angle includes the arrival angle and/or the departure angle. The arrival angle is the angle between the received signal and the receiver antenna. The departure angle is the angle between the transmitted signal and the transmitting antenna. For example, as shown in FIG. 2, A indicates the arrival angle and D indicates the departure angle. The accuracy and flexibility of the bandwidth determination is improved by the suggestion of the bandwidth required for measuring the relative angle, which also satisfies the suggestion of the bandwidth required for measuring the arrival angle and/or the departure angle.

In another scenario, the bandwidth indication information carried in the capability indication message sent by the first terminal device is used for representing the bandwidth used for measuring the relative distance, which achieves the suggestion of the bandwidth required for measuring the relative distance, and improves the accuracy and flexibility of the bandwidth determination.

In yet another scenario, the bandwidth indication information carried in the capability indication message sent by the first terminal device is used for representing the bandwidth used for measuring the relative distance and representing the bandwidth used for measuring the relative angle, and the relative angle includes the arrival angle and/or the departure angle, which achieves the suggestion of the bandwidth required for measuring the relative distance and the relative angle, and improves the accuracy and flexibility of the bandwidth determination.

As a third implementation, the bandwidth indication information carried in the capability indication message sent by the first terminal device is divided based on the transmission direction for representing at least one of:

a bandwidth used for sending a measurement positioning signal; or a bandwidth used for receiving a measurement positioning signal.

The representation of different bandwidths based on different scenarios and requirements is achieved, satisfying the requirements for the bandwidth determination of different scenarios, and improving the flexibility of the bandwidth determination.

In the embodiment of the present disclosure, where the bandwidth indication information is different indication information, the bandwidths need to be indicated by different identities. As an implementation, the bandwidth is represented using a bandwidth part identity and/or a resource pool identity. Different bandwidths may be represented by different bandwidth part identities and/or resource pool identities.

In this embodiment, the bandwidth part (BWP) is a subset bandwidth of the total bandwidth of the cell, and the bandwidth part identity is used for indicating different bandwidth indication information.

The resource pool includes at least one of: a time domain resource, a frequency domain resource, a subcarrier interval, a cyclic prefix, a cell identity, a carrier identity, or a frequency band identity.

As an implementation, the bandwidth includes a maximum bandwidth and/or a bandwidth list. The maximum bandwidth and/or the bandwidth list may be used for indicating the corresponding carrier frequency, respectively.

In the embodiments of the present disclosure, different terminal devices may support different bandwidths for positioning, and therefore, negotiation of the bandwidth used for positioning is required between the terminal devices performing positioning to achieve the flexibility of the bandwidth determination, and the accuracy of positioning can be increased based on the determined bandwidth. In the embodiments of the present disclosure, the first terminal device sends the capability indication message to the second terminal device to cause the second terminal device to determine the bandwidth used for positioning based on the bandwidth supported by the first terminal device for positioning as indicated by the bandwidth indication information of the first terminal device carried in the capability indication message, i.e., the bandwidth used for positioning determined based on the capability limitation of the first terminal device, realizing that the devices negotiate, based on the capability of the bandwidth of the devices, to determine the bandwidth used for positioning, improving the flexibility of the bandwidth determination and the reliability of positioning.

In one implementation of the embodiments of the present disclosure, the bandwidth supported by the first terminal device for positioning includes a maximum bandwidth and/or a bandwidth list, the maximum bandwidth and the bandwidth list include the corresponding carrier frequency, and the carrier frequency is a frequency at which the signal is loaded during signal transmission between the first terminal device and the second terminal device.

In the positioning method provided by the embodiments of the present disclosure, the second terminal device receives the capability indication message sent by the first terminal device, the capability indication message carries the bandwidth indication information of the first terminal device, and the bandwidth indication information of the first terminal device represents the bandwidth supported by the first terminal device for positioning. In the present disclosure, the target bandwidth is determined by negotiation between the second terminal device and the first terminal device, and the negotiation is achieved by receiving the bandwidth supported by the first terminal device for positioning. By adding the bandwidth negotiation mechanism, flexibility of the bandwidth determination is enhanced and positioning accuracy is improved.

FIG. 6 is a schematic flowchart of another positioning method provided by an embodiment of the present disclosure. The method is applied to a first terminal device.

Based on the positioning method provided in FIG. 6, it is illustrated that the first terminal device, through receiving a bandwidth suggested by a second terminal device for positioning carried in a capability request message sent by the second terminal device, determines a supported bandwidth for positioning to improve the accuracy of the bandwidth determination. As shown in FIG. 6, the method includes steps 601 to 602.

In the step 601, a capability request message is sent to the first terminal device.

In this embodiment, the capability request message sent by the second terminal device carries bandwidth indication information of the second terminal device, and the bandwidth indication information of the second terminal device in the capability request message represents a bandwidth supported by the second terminal device for positioning.

It is to be understood that the bandwidth supported by the second terminal device for positioning is the suggested bandwidth for use by the first terminal device as determined by the second terminal device based on the positioning requirement. The positioning requirement is, for example, a requirement for positioning accuracy, which is not limited in this embodiment.

In this embodiment, the capability request message may be sent by the second terminal device to the first terminal device in response to a request from the first terminal device. Alternatively, the second terminal device actively sends the capability request message to the first terminal device that needs to be negotiated to determine the bandwidth for positioning. While the capability request message is sent, the suggested bandwidth for use by the first terminal device determined by the second terminal device is carried.

As an implementation, the capability request message is carried by a message supporting the PC5 radio resource control (RRC) protocol.

As another implementation, the capability request message is carried by a message supporting the PC5-signalling protocol (PC5-S) protocol.

In one example of the present disclosure, the capability request message carries a target field, and the target field is used for indicating the first terminal device to send the capability indication message.

The bandwidth indication information in the embodiments of the present disclosure may contain different information in different scenarios, which are described separately below by different implementations.

As an implementation, the bandwidth indication information carried in the capability request message sent by the second terminal device is divided based on frequency for representing at least one of:
  bandwidth indication information corresponding to at least one carrier frequency;
  bandwidth indication information corresponding to each carrier frequency of intra-band carrier aggregation;

bandwidth indication information corresponding to each carrier frequency of inter-band carrier aggregation; or
  bandwidth indication information corresponding to each frequency band of inter-band carrier aggregation.

As an implementation, the bandwidth indication information includes an indicator bit used for representing whether distance measurement and/or angle measurement based on carrier aggregation is supported. The indicator bit indicates whether each carrier frequency of carrier aggregation or a single each carrier frequency is used for the distance measurement and/or angle measurement.

As a second implementation, the bandwidth indication information carried in the capability request message sent by the second terminal device is divided based on function for representing at least one of:
  a bandwidth used for measuring a relative angle, and the relative angle includes an arrival angle and/or a departure angle; or
  a bandwidth used for measuring a relative distance.

In one scenario, the bandwidth indication information carried in the capability request message sent by the second terminal device is used for representing the bandwidth used for measuring the relative angle, herein, the relative angle includes the arrival angle and/or the departure angle. The accuracy and flexibility of the bandwidth determination is improved by the suggestion of the bandwidth required for measuring the relative angle, which also satisfies the suggestion of the bandwidth required for measuring the arrival angle and/or the departure angle.

In another scenario, the bandwidth indication information carried in the capability request message sent by the second terminal device is used for representing the bandwidth used for measuring the relative distance, which achieves the suggestion of the bandwidth required for measuring the relative distance, and improves the accuracy and flexibility of the bandwidth determination.

In yet another scenario, the bandwidth indication information carried in the capability request message sent by the second terminal device is used for representing the bandwidth used for measuring the relative distance and representing the bandwidth used for measuring the relative angle, and the relative angle includes the arrival angle and/or the departure angle, which achieves the suggestion of the bandwidth required for measuring the relative distance and the relative angle, and improves the accuracy and flexibility of the bandwidth determination.

As a third implementation, the bandwidth indication information carried in the capability request message sent by the second terminal device is divided based on the transmission direction for representing at least one of:
  a bandwidth used for sending a measurement positioning signal; or
  a bandwidth used for receiving a measurement positioning signal.

The representation of different bandwidths based on different scenarios and requirements is achieved, satisfying the requirements for the bandwidth determination of different scenarios, and improving the flexibility of the bandwidth determination.

In this embodiment, after receiving the capability request information of the second terminal device, the first terminal device determines, based on the bandwidth indication information of the second terminal device, the bandwidth indication information of the first terminal device carried in the capability indication message.

In this embodiment, after the first terminal device obtains the bandwidth indication information of the second terminal device, the bandwidth supported by the first terminal device for positioning is determined based on the capability of the first terminal device and the bandwidth indication information of the second terminal device, realizing that the first terminal device and the second terminal device negotiate, based on their own capabilities, to determine the supported bandwidth for positioning, improving the flexibility of the bandwidth determination, and thus improving the reliability of positioning based on the supported bandwidth for positioning determined according to the negotiation.

It is noted that the bandwidth indication information of the first terminal device carried in the capability indication message correspondingly represents different information based on the information represented by the received bandwidth indication information of the second terminal device. For details, please refer to the description of different implementations of the bandwidth indication information in the aforementioned embodiments, which will not be repeated here.

In the embodiment of the present disclosure, where the bandwidth indication information is different indication information, the bandwidths need to be indicated by different identities. As an implementation, the bandwidth is represented using a bandwidth part identity and/or a resource pool identity. Different bandwidths may be represented by different bandwidth part identities and/or resource pool identities.

In this embodiment, the bandwidth part (BWP) is a subset bandwidth of the total bandwidth of the cell, and the bandwidth part identity is used for indicating different bandwidth indication information.

The resource pool includes at least one of: a time domain resource, a frequency domain resource, a subcarrier interval, a cyclic prefix, a cell identity, a carrier identity, or a frequency band identity.

As an implementation, the bandwidth includes a maximum bandwidth and/or a bandwidth list. The maximum bandwidth and/or the bandwidth list may be used for indicating the corresponding carrier frequency, respectively.

In the step 602, the capability indication message sent by the first terminal device is received.

The capability indication message carries bandwidth indication information of the first terminal device, and the bandwidth indication information of the first terminal device represents a bandwidth supported by the first terminal device for positioning.

The step 602, which may refer to the explanation and description in the above embodiments, is based on the same principle and is not repeated herein.

In the positioning method provided by the embodiments of the present disclosure, the second terminal device sends the capability request message to the first terminal device to cause the first terminal device to determine the bandwidth supported by the first terminal device for positioning based on the capability of the first terminal device and the information indicated by the bandwidth indication information of the second terminal device, realizing that the first terminal device and the second terminal device negotiate, based on the measuring requirement and their own capabilities, to determine the supported bandwidth for positioning, improving the flexibility of the bandwidth determination, and thus improving the reliability of positioning based on the supported bandwidth for positioning determined according to the negotiation.

FIG. 7 is a schematic flowchart of another positioning method provided by an embodiment of the present disclosure. The method is applied to a first terminal device.

Based on the positioning method provided in FIG. 7, it is illustrated that the first terminal device, after sending a capability indication message to a second terminal device, further negotiates based on bandwidth indication information carried in the measurement request to determine the final bandwidth for positioning. As shown in FIG. 7, the method includes steps 701 to 703.

In the step 701, a measurement request is to the first second terminal device, and the measurement request carries bandwidth indication information of the second terminal device.

The bandwidth indication information of the second terminal device in the measurement request represents a bandwidth suggested by the second terminal device for positioning.

In this embodiment, the bandwidth suggested by the second terminal device for positioning is the bandwidth used for this positioning determined based on the bandwidth supported by the first terminal device for positioning represented by the bandwidth indication information of the first terminal device, which achieves a further negotiated determination of the bandwidth.

In this embodiment, after receiving the measurement request sent by the second terminal device, the first terminal device determines whether the suggested bandwidth for positioning can be used for this positioning based on the bandwidth suggested by the second terminal device for positioning.

As an implementation, the measurement request is carried by a message supporting the PC5 radio resource control (RRC) protocol.

As another implementation, the measurement request is carried by a message supporting the PC5-signalling protocol (PC5-S) protocol.

In the step 702, a measurement response sent by the first terminal device is received.

As an implementation, the measurement response is carried by a message supporting the PC5 radio resource control (RRC) protocol.

As another implementation, the measurement response is carried by a message supporting the PC5-signalling protocol (PC5-S) protocol.

In the step 703, the second terminal device determines, based on the measurement response, that positioning based on the bandwidth indication information carried in the measurement request is rejected or accepted by the first terminal device.

In this embodiment, the second terminal device sends the measurement request to the first terminal device, causing the first terminal device to determine, based on the obtained bandwidth suggested by the second terminal device for positioning, whether the suggested bandwidth for positioning can be used for this positioning. In one scenario, if the suggested bandwidth for positioning can be used for this positioning, the measurement response sent by the first terminal device is used for accepting positioning based on the bandwidth indication information carried in the measurement request. In another scenario, if the suggested bandwidth for positioning cannot be used for this positioning, the measurement response sent by the first terminal device is used for rejecting positioning based on the bandwidth indication information carried in the measurement request. In some examples, when sending a rejected measurement response, the measurement response carries bandwidth indication information accepted by the first terminal device, indicating the final bandwidth used for this positioning, improving the flexibility and accuracy of the bandwidth determination, and thus improving the accuracy of positioning based on the bandwidth.

In the positioning method provided by the embodiments of the present disclosure, the final bandwidth used for this positioning is determined by negotiation between the first terminal device and the second terminal device, improving the flexibility and accuracy of the bandwidth determination, and thus improving the accuracy of positioning based on bandwidth.

Correspondingly to the positioning methods provided by the aforementioned embodiments, the present disclosure also provides a positioning apparatus, which is provided in the first terminal device. As the positioning apparatus provided by the embodiments of the present disclosure corre- spond to the positioning methods provided by any of the embodiments in FIG. 1 to FIG. 4, the implementation of the positioning method is also applicable to the positioning apparatus provided by the embodiments of the present disclosure, and will not be described in detail in the embodi- ments of the present disclosure.

FIG. 8 is a schematic structure diagram of a positioning apparatus provided by an embodiment of the present dis- closure.

As shown in FIG. 8, the apparatus includes a sending module 81.

The sending module 81 is configured to send a capability indication message to a second terminal device, the capa- bility indication message carries bandwidth indication infor- mation of the first terminal device, and the bandwidth indication information of the first terminal device represents a bandwidth supported by the first terminal device for positioning.

Furthermore, in one implementation of the embodiments of the present disclosure, the apparatus further includes:

a receiving module, configured to receive a capability request message sent by the second terminal device.

In one implementation of the embodiments of the present disclosure, the capability request message carries bandwidth indication information of the second terminal device, and the bandwidth indication information of the second terminal device in the capability request message represents a band- width supported by the second terminal device for position- ing.

In one implementation of the embodiments of the present disclosure, the apparatus further includes:

a determination module, configured to determine, based on the bandwidth indication information of the second terminal device, the bandwidth indication information of the first terminal device carried in the capability indication message.

In one implementation of the embodiments of the present disclosure, the capability request message carries a target field, and the target field is used for indicating the first terminal device to send the capability indication message.

In one implementation of the embodiments of the present disclosure, the receiving module is further configured to receive a measurement request sent by the second terminal device, the measurement request carries bandwidth indication information of the second terminal device, and the bandwidth indication information of the second terminal device in the measurement request represents a bandwidth suggested by the second terminal device for positioning.

The sending module 81 is further configured to send a measurement response to the second terminal device, the measurement response is used for rejecting or accepting positioning based on the bandwidth indication information carried in the measurement request.

In one implementation of the embodiments of the present disclosure, the measurement response is used for rejecting positioning based on the bandwidth indication information carried in the measurement request, and the measurement response carries bandwidth indication information accepted by the first terminal device.

In one implementation of the embodiments of the present disclosure, the bandwidth indication information includes at least one of:

bandwidth indication information corresponding to at least one carrier frequency;

bandwidth indication information corresponding to each carrier frequency of intra-band carrier aggregation;

bandwidth indication information corresponding to each carrier frequency of inter-band carrier aggregation; or bandwidth indication information corresponding to each frequency band of inter-band carrier aggregation.

In one implementation of the embodiments of the present disclosure, the bandwidth indication information includes an indicator bit used for representing whether distance mea- surement and/or angle measurement based on carrier aggre- gation is supported.

In one implementation of the embodiments of the present disclosure, the bandwidth indication information is used for representing at least one of: a bandwidth used for measuring a relative angle, and the relative angle includes an arrival angle and/or a departure angle; or a bandwidth used for measuring a relative distance.

In one implementation of the embodiments of the present disclosure, the bandwidth indication information is used for representing at least one of:

a bandwidth used for sending a measurement positioning signal; or a bandwidth used for receiving a measurement position- ing signal.

In one implementation of the embodiments of the present disclosure, the bandwidth includes a maximum bandwidth and/or a bandwidth list.

In one implementation of the embodiments of the present disclosure, the bandwidth is represented using a bandwidth part identity and/or a resource pool identity.

In the positioning apparatus provided by the embodiments of the present disclosure, the first terminal device sends the capability indication message to the second terminal device, the capability indication message carries the bandwidth indication information of the first terminal device, and the bandwidth indication information of the first terminal device represents the bandwidth supported by the first terminal device for positioning. In the present disclosure, the target bandwidth is determined by negotiation between the second terminal device and the first terminal device, and the nego- tiation is achieved by sending the bandwidth supported by the first terminal device for positioning to the second ter- minal device. By adding the bandwidth negotiation mecha- nism, flexibility of the bandwidth determination is enhanced and positioning accuracy is improved.

Correspondingly to the positioning methods provided by the aforementioned embodiments, the present disclosure also provides a positioning apparatus, which is provided in the second terminal device. As the positioning apparatus provided by the embodiments of the present disclosure correspond to the positioning methods provided by any of the embodiments in FIG. 5 to FIG. 7, the implementation of the positioning method is also applicable to the positioning apparatus provided by the embodiments of the present disclosure, and will not be described in detail in the embodiments of the present disclosure.

Figure 9:
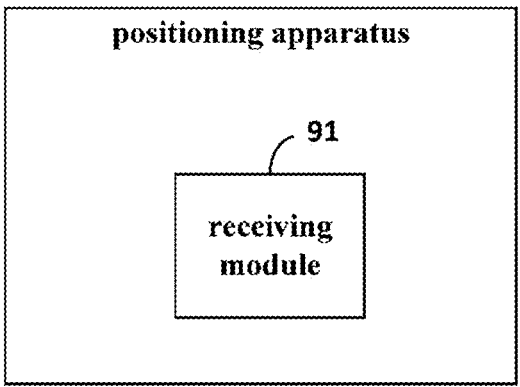
FIG. 9 is a schematic structure diagram of another positioning apparatus provided by an embodiment of the present disclosure.

FIG. 9 is a schematic structure diagram of another positioning apparatus provided by an embodiment of the present disclosure.

As shown in FIG. 9, the apparatus includes a receiving module 91.

The receiving module 91 is configured to receive a capability indication message sent by a first terminal device, the capability indication message carries bandwidth indication information of the first terminal device, and the bandwidth indication information of the first terminal device represents a bandwidth supported by the first terminal device for positioning.

Furthermore, as one possible implementation of the present disclosure, the receiving module 91 is further configured to send a capability request message to the first terminal device.

As one possible implementation of the present disclosure, the capability request message carries bandwidth indication information of the second terminal device, and the bandwidth indication information of the second terminal device represents a bandwidth supported by the second terminal device for positioning.

As one possible implementation of the present disclosure, the bandwidth indication information carried in the capability indication message is determined based on the bandwidth indication information of the second terminal device.

As one possible implementation of the present disclosure, the capability request message carries a target field, and the target field is used for indicating the first terminal device to send the capability indication message.

As one possible implementation of the present disclosure, the apparatus further includes a receiving module and a determination module.

The receiving module 91 is further configured to send a measurement request to the first terminal device, and the measurement request carries bandwidth indication information of the second terminal device.

The receiving module is configured to receive a measurement response sent by the first terminal device.

The determination module is configured to determine, based on the measurement response, that positioning based on the bandwidth indication information carried in the measurement request is rejected or accepted by the first terminal device.

As one possible implementation of the present disclosure, the measurement response is used for rejecting positioning based on the bandwidth indication information carried in the measurement request, and the measurement response carries bandwidth indication information accepted by the first terminal device.

As one possible implementation of the present disclosure, the bandwidth indication information includes at least one of:

bandwidth indication information corresponding to at least one carrier frequency;

bandwidth indication information corresponding to each carrier frequency of intra-band carrier aggregation;

bandwidth indication information corresponding to each carrier frequency of inter-band carrier aggregation; or bandwidth indication information corresponding to each frequency band of inter-band carrier aggregation.

As one possible implementation of the present disclosure, the bandwidth indication information includes an indicator bit used for representing whether distance measurement and/or angle measurement based on carrier aggregation is supported.

As one possible implementation of the present disclosure, the bandwidth indication information is used for representing at least one of:

a bandwidth used for measuring a relative angle, and the relative angle includes an arrival angle and/or a departure angle; or a bandwidth used for measuring a relative distance.

As one possible implementation of the present disclosure, the bandwidth indication information is used for representing at least one of:

a bandwidth used for sending a measurement positioning signal; or a bandwidth used for receiving a measurement positioning signal.

As one possible implementation of the present disclosure, the bandwidth includes a maximum bandwidth and/or a bandwidth list.

As one possible implementation of the present disclosure, the bandwidth is represented using a bandwidth part identity and/or a resource pool identity.

In the positioning apparatus provided by the embodiments of the present disclosure, the second terminal device receives the capability indication message sent by the first terminal device, the capability indication message carries the bandwidth indication information of the first terminal device, and the bandwidth indication information of the first terminal device represents the bandwidth supported by the first terminal device for positioning. In the present disclosure, the target bandwidth is determined by negotiation between the second terminal device and the first terminal device, and the negotiation is achieved by receiving the bandwidth supported by the first terminal device for positioning. By adding the bandwidth negotiation mechanism, flexibility of the bandwidth determination is enhanced and positioning accuracy is improved.

In order to achieve the above embodiments, the present disclosure also provides a communication device.

The communication device provided by an embodiment of the present disclosure includes: a processor, a transceiver, a memory, and an executable program, the executable program is stored on the memory and capable of being executed by the processor, and the processor, when executing the executable program, implements the aforementioned positioning method.

The communication device may be the aforementioned first terminal device or second terminal device.

The processor may include various types of storage medium. The storage medium is a non-transitory computer storage medium, which is capable of continuing to store information thereon in memory after the communication device is powered down. Herein, the communication device includes a network device or terminal.

The processor may be connected to the memory through a bus or other means for reading the executable program stored on the memory, for example, as shown in at least one of FIG. 1 to FIG. 4, or FIG. 5 to FIG. 7.

In order to achieve the above embodiments, the present disclosure also provides a computer storage medium.

The computer storage medium provided by an embodiment of the present disclosure stores an executable program. The executable program, when executed by a processor, is capable of implementing the aforementioned method, for example, as shown in at least one of FIG. 1 to FIG. 4, or FIG. 5 to FIG. 7.

Figure 10:
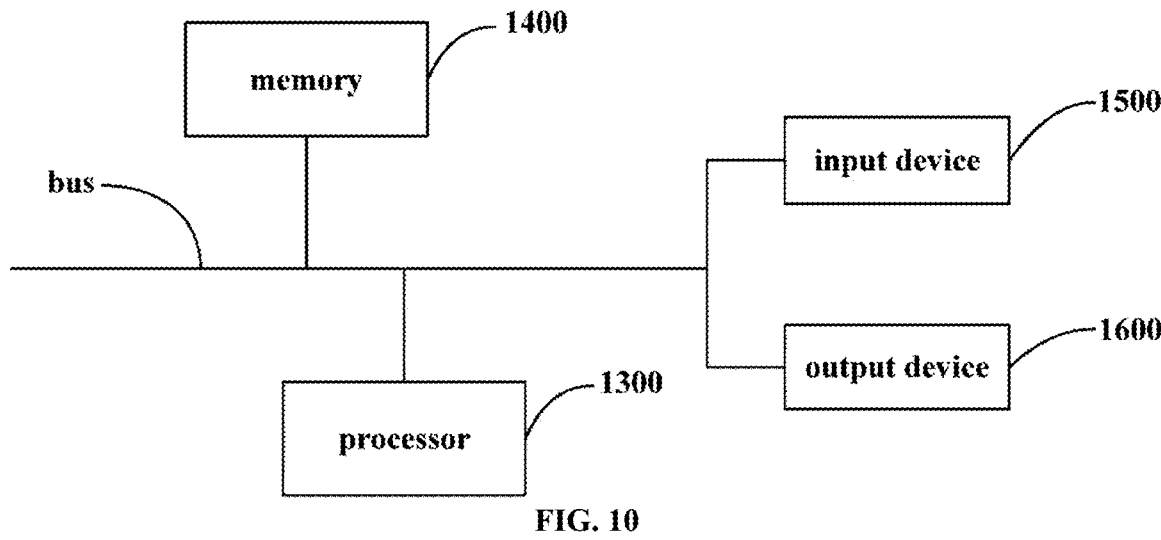
FIG. 10 is a block diagram of a communication device provided by an embodiment of the present disclosure.

FIG. 10 is a block diagram of a communication device provided by an embodiment of the present disclosure. The communication device is intended to represent various forms of digital computers, such as laptops, desktops, workstations, personal digital assistants, blade servers, mainframe computer computers, and other suitable computers. The communication device may also represent various forms of mobile devices, such as personal digital processing, cellular phones, smartphones, wearable devices, and other similar computing devices. The components shown herein, their connections and relationships, and their functions are only examples and are not intended to limit the implementation of the present disclosure described and/or claimed herein.

As shown in FIG. 10, the communication device includes: one or more processors 1300, one or more memories 1400, and interfaces for connecting various components. The interfaces include a high-speed interface and a low-speed interface. The components are interconnected using different buses and may be mounted on a common mainboard or otherwise mounted as desired. The processor may process instructions executed within the communication device, including instructions stored in or on the memory to display graphical information of the GUI on an external input/output device (e.g., a display device coupled to the interface). In other implementations, multiple processors and/or multiple buses may be used with multiple memories, if desired. Similarly, a plurality of communication devices may be connected, with individual devices providing some of the necessary operations (e.g., as a server array, a group of blade servers, or a multiprocessor system). An example of a processor 1300 is shown in FIG. 10.

The memory 1400 is a non-instantaneous computer-readable storage medium provided by the present disclosure. The memory stores an instruction executable by at least one processor to cause the at least one processor to execute the positioning method provided by the present disclosure. The non-instantaneous computer-readable storage medium of the present disclosure stores a computer instruction, and the computer instruction is used for causing the computer to execute the positioning method provided by the present disclosure.

The memory 1400, as a non-instantaneous computer-readable storage medium, may be used for storing a non-instantaneous software program, a non-instantaneous computer-executable program, and a module, such as a program instruction/module corresponding to the positioning method in the embodiments of the present disclosure (e.g., the sending module 81 shown in FIG. 8, or the receiving module 91 shown in FIG. 9). By running the non-instantaneous software program, instruction, and module stored in the memory 1400, the processor 1300 executes various functional applications of the server as well as data processing, implementing the positioning method in the method embodiments described above.

The memory 1400 may include a storage program area and a storage data area, the storage program area may store an operating system and an application required for at least one function, and the storage data area may store data created based on the use of the positioning communication device, and the like. In addition, the memory 1400 may include a high-speed random access memory, and may also include a non-instantaneous memory, such as at least one disk memory device, flash memory device, or other non-instantaneous solid state memory device. In some examples, the memory 1400 may alternatively include memories that are remotely located relative to the processor 1300, and these remote memories may be connected to the positioning communication device via a network. Examples of the network include, but are not limited to, Internet, a corporate intranet, a local area network, a mobile communication network, and combinations thereof.

The communication device may also include an input device 1500 and an output device 1600. The processor 1300, memory 1400, input device 1500, and output device 1600 may be connected through a bus or other means, with connection via a bus being used as an example in FIG. 10.

The Input device 1500 may receive input numeric or character information, as well as generate key signal input related to user settings and functional control of the positioning communication device, such as a touch screen, keypad, mouse, trackpad, touchpad, indicator stick, one or more mouse buttons, trackball, joystick, and other input devices. The output device 1600 may include a display device, auxiliary lighting device (e.g., LED) and haptic feedback device (e.g., vibration motor), etc. The display device may include, but is not limited to, a liquid crystal display (LCD), a light-emitting diode (LED) display, and a plasma display. In some embodiments, the display device may be a touch screen.

Various implementations of the systems and techniques described herein may be implemented in a digital electronic circuit system, integrated circuit system, specialized application specific integrated circuits (ASIC), computer hardware, firmware, software, and/or combinations thereof. These various implementations may include: an implementation in one or more computer programs, the one or more computer programs may be executed and/or interpreted on a programmable system including at least one programmable processor, and the programmable processor may be a dedicated or general-purpose programmable processor that may receive data and instructions from a storage system, at least one input device, and at least one output device, and transfer data and instructions to the storage system, the at least one input device, and the at least one output device.

These computing programs (also referred to as programs, software, software applications, or code) include machine instructions for a programmable processor and may be implemented using high-level procedural and/or object-oriented programming languages, and/or assembly/machine languages. As used herein, the terms "machine-readable medium" and "computer-readable medium" refer to any computer program product, device, and/or apparatus (e.g., disk, CD-ROM, memory, programmable logic device (PLD)) used for providing the machine instructions and/or data to the programmable processor, including a machine-readable medium that receives the machine instructions as machine-readable signals. The term "machine-readable signal" refers to any signal used for providing the machine instructions and/or data to the programmable processor.

To provide interaction with a user, the systems and techniques described herein may be implemented on a computer having: a display device (e.g., a cathode ray tube (CRT) or liquid crystal display (LCD) monitor) for displaying information to the user; and a keyboard and pointing device (e.g., a mouse or trackball) through which the user can provide input to the computer. Other types of devices may also be used to provide interaction with the user; for example, the feedback provided to the user may be any form of sensory feedback (e.g., visual feedback, auditory feedback, or haptic feedback); and the input from the user may be received in any form (including acoustic input, voice input, or haptic input).

The systems and techniques described herein may be implemented in a computing system including a back-end component (e.g., as a data server), a computing system including a middleware component (e.g., an application server), a computing system including a front-end compo- nent (e.g., a user computer having a graphical user interface or a web browser through which a user can interact with the implementation of the systems and techniques described herein), or a computing system including any combination of the back-end component, middleware component, or front-end component described above. The components of the system may be interconnected via any form or medium of digital data communication (e.g., a communication net- work). Examples of the communication network include: a local area network (LAN), wide area network (WAN), and Internet.

The computer system may include a client and a server. The client and server are generally remote from each other and typically interact through a communication network. The relationship of the client and the server is generated by computer programs that run on a corresponding computer and have a client-server relationship with each other.

After considering the specification and practicing the present disclosure disclosed herein, those skilled in the art will easily come up with other embodiments of the present disclosure. The purpose of the present disclosure is to cover any variations, uses, or adaptive changes of the present disclosure, which follow the general principles of the pres- ent disclosure and include common knowledge or com- monly used technical means in the technical field that are not disclosed in the present disclosure. The specification and embodiments are only considered exemplary, and the true scope and spirit of the present disclosure are indicated by the following claims.

It is to be understood that the present disclosure is not limited to the precise structure already described above and illustrated in the accompanying drawings, and that various modifications and changes may be made without departing from the scope of the present disclosure. The scope of the present disclosure is limited only by the appended claims.

What is claimed is:

1. A positioning method, comprising:
receiving, by a first terminal device, bandwidth indication information of a second terminal device sent by the second terminal device, wherein the bandwidth indica- tion information of the second terminal device repre- sents a bandwidth supported or suggested by the second terminal device for positioning;
determining, by the first terminal device and based on the bandwidth indication information of the second termi- nal device, bandwidth indication information of the first terminal device carried in a capability indication message;
sending, by the first terminal device, the capability indi- cation message to the second terminal device, wherein the capability indication message carries the bandwidth indication information of the first terminal device, and the bandwidth indication information of the first ter- minal device represents a bandwidth supported by the first terminal device for positioning.

2. The method according to claim 1, further comprising:
receiving, by the first terminal device, a capability request message sent by the second terminal device.

3. The method according to claim 2, wherein the capability request message carries the bandwidth indication information of the second terminal device.

4. The method according to claim 2, wherein the capability request message carries a target field; and the target field is used for indicating the first terminal device to send the capability indication message.

5. The method according to claim 1, further comprising:
receiving, by the first terminal device, a measurement request sent by the second terminal device, wherein the measurement request carries the bandwidth indication information of the second terminal device, and the bandwidth indication information of the second termi- nal device in the measurement request represents the bandwidth suggested by the second terminal device for positioning; and
sending, by the first terminal device, a measurement response to the second terminal device, wherein the measurement response is used for indicating that posi- tioning based on the bandwidth indication information carried in the measurement request is rejected or accepted by the first terminal device.

6. The method according to claim 5, wherein the measurement response is used for indicating that positioning based on the bandwidth indication infor- mation carried in the measurement request is rejected by the first terminal device; and the measurement response carries bandwidth indication information accepted by the first terminal device.

7. The method according to claim 1, wherein the band- width indication information comprises at least one of following information:
bandwidth indication information corresponding to at least one carrier frequency;
bandwidth indication information corresponding to each carrier frequency of intra-band carrier aggregation;
bandwidth indication information corresponding to each carrier frequency of inter-band carrier aggregation; or
bandwidth indication information corresponding to each frequency band of inter-band carrier aggregation.

8. The method according to claim 7, wherein the bandwidth indication information comprises an indi- cator bit used for representing whether measurement based on carrier aggregation is supported, and the measurement comprises at least one of distance mea- surement or angle measurement.

9. The method according to claim 1, wherein the band- width indication information is used for representing at least one of following bandwidths:
a bandwidth used for measuring a relative angle, and the relative angle comprises at least one of an arrival angle or a departure angle; or
a bandwidth used for measuring a relative distance.

10. A positioning method, comprising:
sending, by a second terminal device, bandwidth indica- tion information of the second terminal device to a first terminal device, wherein the bandwidth indication information of the second terminal device represents a bandwidth supported or suggested by the second ter- minal device for positioning; and
receiving, by the second terminal device, a capability indication message sent by the first terminal device, wherein the capability indication message carries band- width indication information of the first terminal device, and the bandwidth indication information of the first terminal device represents a bandwidth supported by the first terminal device for positioning,
wherein the bandwidth indication information of the first terminal device carried in the capability indication message is determined based on the bandwidth indica- tion information of the second terminal device.

11. The method according to claim 10, further comprising:

sending, by the second terminal device, a measurement request to the first terminal device, wherein the measurement request carries the bandwidth indication information of the second terminal device;

receiving, by the second terminal device, a measurement response sent by the first terminal device; and determining, by the second terminal device and based on the measurement response, that positioning based on the bandwidth indication information carried in the measurement request is rejected or accepted by the first terminal device.

12. The method according to claim 11, wherein the measurement response is used for indicating that positioning based on the bandwidth indication information carried in the measurement request is rejected by the first terminal device; and the measurement response carries bandwidth indication information accepted by the first terminal device.

13. The method according to claim 10, wherein the bandwidth indication information comprises at least one of following information:

bandwidth indication information corresponding to at least one carrier frequency;

bandwidth indication information corresponding to each carrier frequency of intra-band carrier aggregation;

bandwidth indication information corresponding to each carrier frequency of inter-band carrier aggregation; or bandwidth indication information corresponding to each frequency band of inter-band carrier aggregation.

14. The method according to claim 13, wherein the bandwidth indication information comprises an indicator bit used for representing whether measurement based on carrier aggregation is supported, and the measurement comprises at least one of distance measurement or angle measurement.

15. The method according to claim 10, wherein the bandwidth indication information is used for representing at least one of following bandwidths:

a bandwidth used for measuring a relative angle, wherein the relative angle comprises at least one of an arrival angle or a departure angle; or a bandwidth used for measuring a relative distance.

16. The method according to claim 10, wherein the bandwidth indication information is used for representing at least one of following bandwidths:

a bandwidth used for sending a measurement positioning signal; or a bandwidth used for receiving a measurement positioning signal.

17. The method according to claim 10, wherein the bandwidth comprises at least one of a maximum bandwidth or a bandwidth list.

18. The method according to claim 10, wherein the bandwidth is represented using at least one of a bandwidth part identity or a resource pool identity.

19. A communication device, comprising:

a transceiver;

a memory; and a processor, connected to the transceiver and the memory respectively, wherein the processor is configured to control sending and receiving of a wireless signal of the transceiver through executing a computer-executable instruction of the memory, and the processor, through executing the computer-executable instruction of the memory, is configured to:

receive bandwidth indication information of a second terminal device sent by the second terminal device, wherein the bandwidth indication information of the second terminal device represents a bandwidth supported or suggested by the second terminal device for positioning;

determine, based on the bandwidth indication information of the second terminal device, bandwidth indication information of the first terminal device carried in a capability indication message;

send the capability indication message to the second terminal device, wherein the capability indication message carries the bandwidth indication information of a first terminal device, and the bandwidth indication information of the first terminal device represents a bandwidth supported by the first terminal device for positioning; or send bandwidth indication information of a second terminal device to a first terminal device, wherein the bandwidth indication information of the second terminal device represents a bandwidth supported or suggested by the second terminal device for positioning; and receive a capability indication message sent by the first terminal device, wherein the capability indication message carries bandwidth indication information of the first terminal device, and the bandwidth indication information of the first terminal device represents a bandwidth supported by the first terminal device for positioning, wherein the bandwidth indication information of the first terminal device carried in the capability indication message is determined based on the bandwidth indication information of the second terminal device.

* * * * *